United States Patent [19]

Easley, Jr.

[11] 4,420,279

[45] Dec. 13, 1983

[54] PRESSURE IMPULSE DENSE PHASE CONVEYING APPARATUS AND METHOD

[75] Inventor: Othel D. Easley, Jr., Houston, Tex.

[73] Assignee: Reactor Services International, Inc., Alvin, Tex.

[21] Appl. No.: 351,196

[22] Filed: Feb. 22, 1982

[51] Int. Cl.³ .............................................. B65G 53/66
[52] U.S. Cl. ........................................ 406/14; 406/50; 406/95; 406/144
[58] Field of Search ............... 406/14, 50, 85, 95, 406/124–126, 144, 153, 194

[56] References Cited

U.S. PATENT DOCUMENTS

| 477,692 | 6/1892 | McConnell | 406/144 |
| 1,675,090 | 6/1928 | Burns et al. | 406/153 |
| 2,077,898 | 4/1937 | Rolff | 406/126 |
| 3,295,896 | 1/1967 | Hurtig | 406/95 X |
| 3,861,830 | 1/1975 | Johnson | 406/85 X |

FOREIGN PATENT DOCUMENTS 636160 12/1978 U.S.S.R. .............................. 406/144

Primary Examiner—John J. Love
Assistant Examiner—Paul A. Sobel

[57] ABSTRACT

An apparatus and method for conveying fluid materials utilizing a venturi having a side opening in the venturi throat section which is opened and closed by pulsing motive fluid into the venturi past a flutter valve, comprising a flexible piece of material attached upstream of the side opening so as to be capable of opening and closing the side opening, thereby admitting slugs of fluid material and forcing the string of slugs through the apparatus.

24 Claims, 8 Drawing Figures

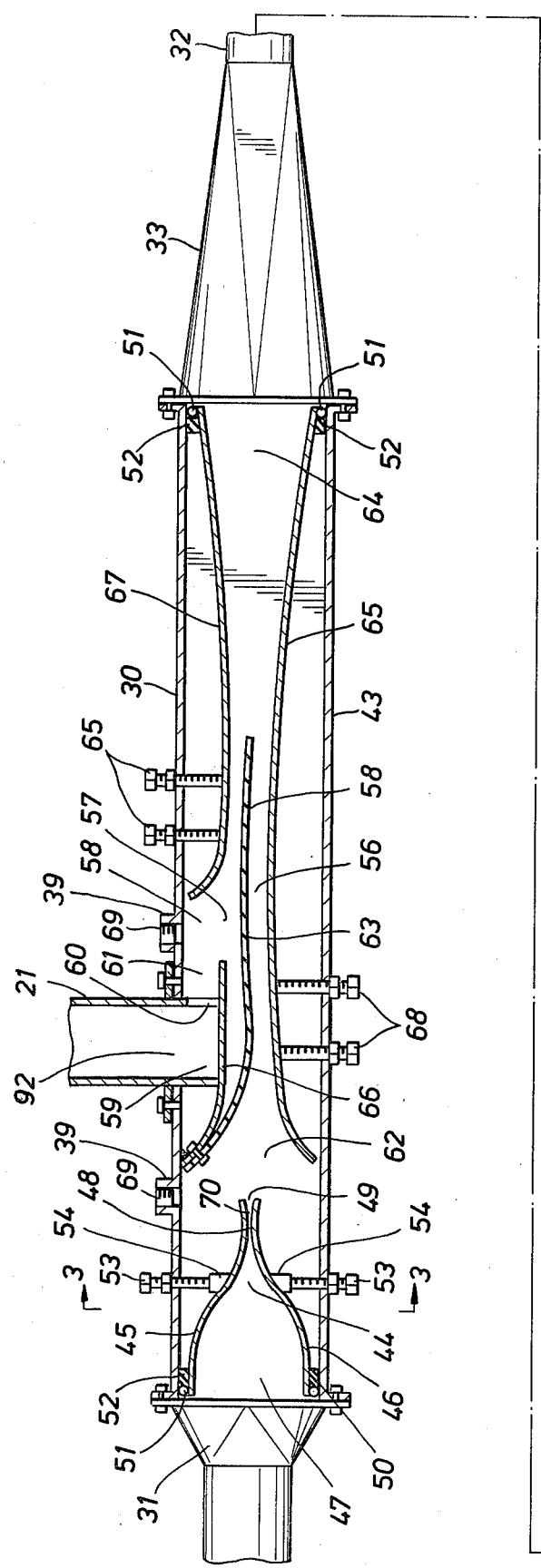
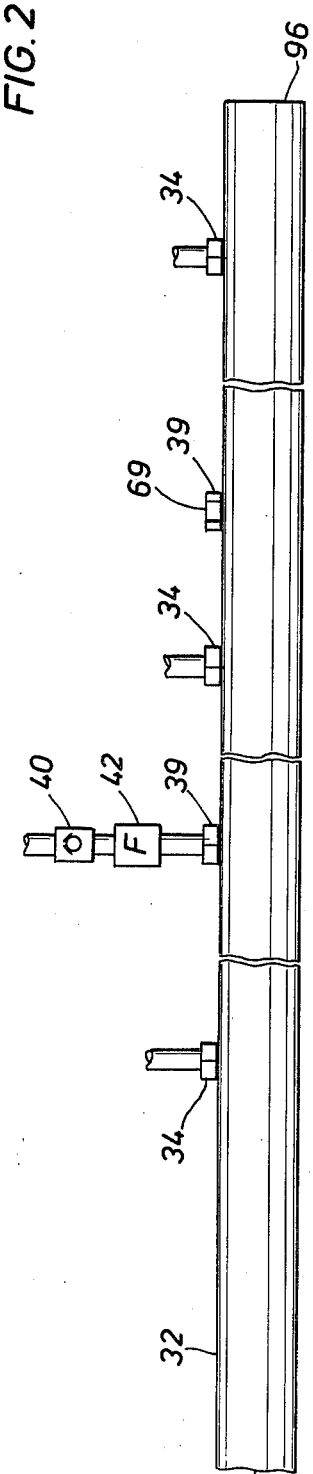
FIG.2

PRESSURE IMPULSE DENSE PHASE CONVEYING APPARATUS AND METHOD

There are many types of pneumatic conveying or transport systems used to move particulate or granular materials such as grain, flour, catalyst, gravel and the like. These systems may range from dilute phase systems which mix fast moving gases and particles, the particles being moved at relatively high velocities through and out of the conveyor or tube, to dense phase systems which push a plug of granular material along the conveyor by applying pressure, sometimes relatively high pressure behind the plug in order to move the plug. The larger the plug of material, the higher the pressure needed, which leads to high velocities at the exit of the conveyor. The typical dense phase system would involve a batch operation in which particles are fed to a hopper, which is connected to the transporter tube, the tube directed into the desired receiving vessel and pressure raised behind the particle in the hopper until the particles have been forced into and out of the tube as a single plug.

Both of the systems described above cause relatively high attrition of the particles being moved (the dense phase system being better than the dilute phase system) and use relatively large volumes of gas and/or relatively high pressure.

A variation on the above described system is known as a pressure impulse conveying system or a timed pulse conveying system. This type of dense phase system involves the introduction of short slugs or plugs of particles into the conveying or transport line, each plug of particles being at least temporarily separated from another plug of particles by a bubble or plug of gas. The string of plugs of particles and slugs of gas are moved down the conveyor into the receiving vessel as plugs of particles and gas. This timed pulse conveying system reduces the pressure needed in the batch dense phase system described above and enables one to handle more fragile particles and to minimize breakage of those particles being moved.

The optimum particle conveying system should be a system which minimizes the exposure of the particles to high velocity gases and high pressure, continuously handles particles, uses a small volume of gas relative to the volume of particles moved, and attrits the particle being moved the least. The present invention is a particle conveying system (that can also convey liquids or gases) which is continuous, uses relatively small amounts of gases (or liquids) compared to the amount of material moved, uses low pressure gas to move plugs of particles at very low velocities and is extremely gentle with even the most fragile particles, (for example catalysts).

SUMMARY OF THE INVENTION

The invention relates to an apparatus and a method which can move fluid materials, gas, liquids or particulate solids using gases or liquids (hydraulic fluids) as the movant or energy supplying media. The present invention relates to a particle conveying apparatus which minimizes the exposure of the particles being moved to high velocity gases and high pressure gases. It relates to a particle conveyor which delivers continuous slugs of particles using low volumes of gas relative to the volume of particles moved. The invention relates to an apparatus and method that moves and delivers slugs or plugs of particles to a desired location with very little attrition of those particles. The invention also relates to an apparatus and method for moving particles which uses a venturi and a flutter valve to introduce slugs or plugs of fluid materials into the conveying system. The invention further relates to a material slug loading apparatus and method of moving fluid materials which employs two venturi in series and where the venturi are rectangular. The invention relates to a materials conveying system employing adjustable venturi and an adjustable flutter valve in order to handle and move a large variety of fluid materials. The invention relates to a pressure pulse conveying system which has a transport tube pressure booster system which delivers gas at a point in the tube where it is needed, at a minimum pressure, to continuously deliver slugs of material. The invention relates to a pressure impulse conveying system with a fluid feed system capable of maintaining a supply of fluid material to the slug loading system. The invention relates to a pressure impulse conveying system where pulses of gas are alternately supplied to the slug loading system and then to the slug moving system. Other objects of the invention will become evident from the descriptions which follow.

BRIEF DESCRIPTION OF THE DRAWINGS

FIG. 2 is a side view of the slug loading section of the invention of FIG. 1 bisected along the line 2—2.

DESCRIPTION OF THE PREFERRED EMBODIMENTS

Figure 1:
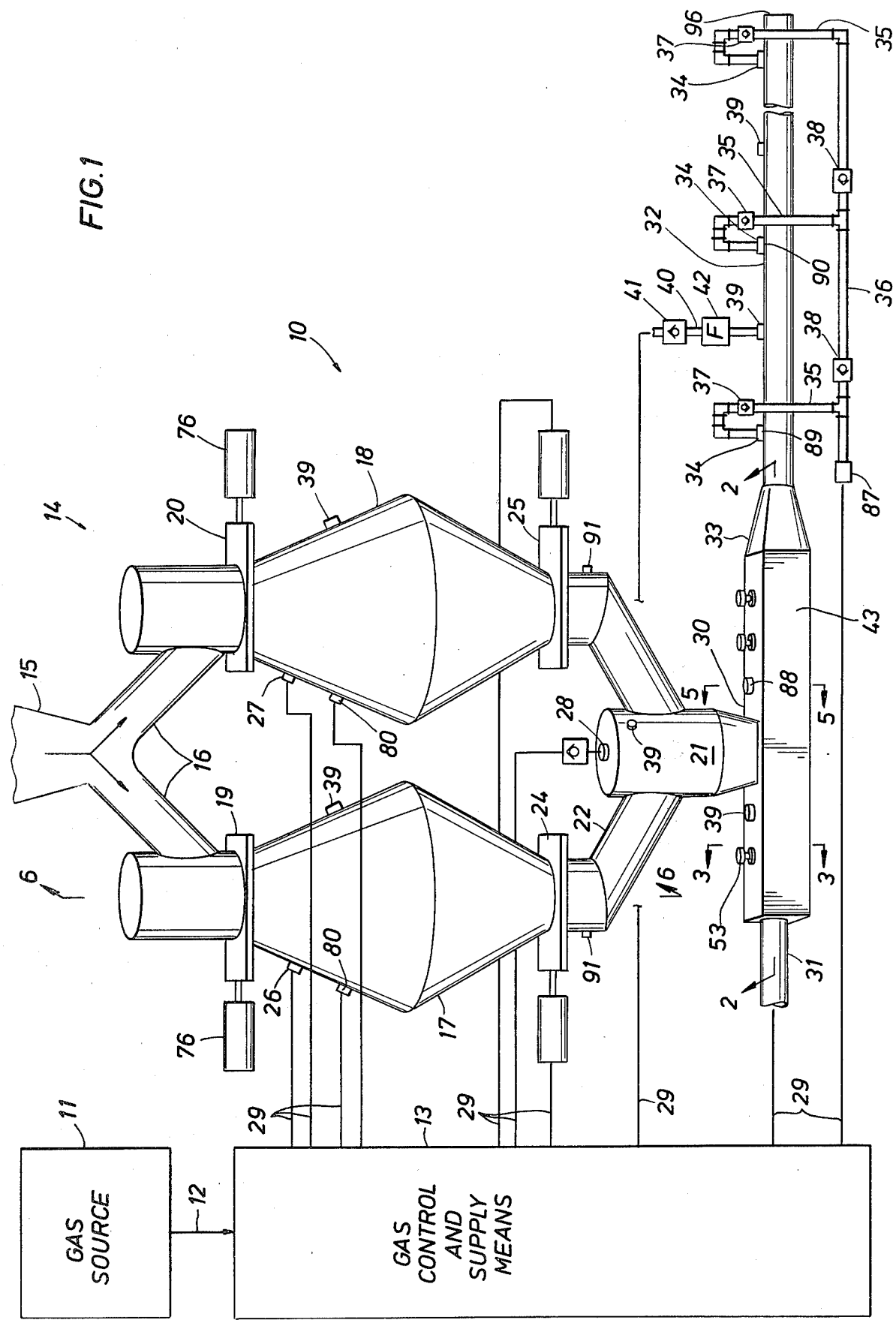
FIG. 1 is a side view of the apparatus of the invention from a position slightly above the apparatus.

The conveying system of this invention is capable of moving any fluid material using either a gas or a liquid as the movant or motive fluid. Solid particulate materials can be moved with gases or liquids, liquids can be moved with other (or the same) liquids or gases and in fact, gases can be moved with liquids or other (or the same) gases. If the slug or plug character of the process is to be maintained, then the material being moved and the motive fluid should not dissolve in each other. While it's conceivable that one gas could be used to move another gas, the gases would move and the slug character would disappear. This is also true of two miscible liquids. The apparatus and method of this invention are particularly suited to move solid particulate material such as grain, gravel, flour, beads, powder, pellets, flakes and the like with gases, most particularly particulate petrochemical catalysts with air.

The apparatus and method will be described below with particular emphasis on a gas motive fluid and a solid particulate material as the fluid material to be moved. While the emphasis is placed on a gas/solid system one such not lose sight of the possibility of other combinations.

The conveying system of this invention is composed of a number of subsystems which are connected and interact with each other. The conveying system comprises a motive fluid or gas source such as one or more compressors and/or one or more tanks of compressed gas or liquids, a means for controlling and supplying the motive fluid from the gas source or liquid source to the conveying system at desired times, places and pressures, a means for forming and introducing slugs of material (a feed mechanism), a means of supplying a continuous source of material to the slug forming means, a slug conveying tube connected to the slug forming means and a pressure booster means for applying additional gas or liquid (motive fluid) where needed. The gas or liquid used in the system can be any fluid which is unreactive under the working conditions, for example steam, nitrogen, air or water. The preferred motive fluid is air, most preferably clean dry air.

The remainder of the description will focus on a gas as the motive fluid and solid particulate material as the material being conveyed, but it should be understood the motive fluid can be substituted for gas and fluid material for solid particulate material, i.e., a liquid could be the motive fluid and a gas or liquid the fluid material.

The means for controlling and supplying gas at the desired places, times, pressure and amounts needed may be any number of systems depending upon the logic employed, i.e., the number of introduction sites, pressures, timing and degree of automation one desires. Once the logic is determined the control and supply means could range from a combination of regulators, valves, pressure sensor, level sensor and timers to a number of gas sources operated by people watching, gauges, timers, site glasses and each other. Once the desired logic is determined it would be obvious to anyone skilled in the art of pneumatic or hydraulic control and supply systems to construct or devise a means for satisfying that logic and a number of different means might satisfy the desired logic. (The preferred logic will be detailed below once the apparatus has been fully described.)

FIG. 1 shows a side view of the fluid material conveyor 10 comprising at least one gas source 11 connected through a tube 12 which allows gas to flow to a means for controlling and supplying gas 13 which controls and supplies gas to the other parts of the apparatus. FIG. 1 also shows the material feed system 14 comprising a material hopper 15, connected by hopper feed tubes 16 to a first feed vessel 17 and a second feed vessel 18, open communication between the hopper 15 and the first and second feed vessels being controlled by a first and second hopper valve means 19 and 20 respectively. One of the preferred valve means types used as the hopper valve means is a pneumatically or hydraulically actuated slide gate valve as depicted in FIG. 1.

Both feed vessels 17 and 18 are connected to a slug hopper 21 through a first feed tube 22 and a second feed tube 23. Communication between each feed vessel 17 and 18 and the slug hopper 21 is individually controlled by the first and second feed valve means 24 and 25. One of the preferred feed valve means types is a pneumatically or hydraulically actuated slide gate valve as depicted in FIG. 1.

Each feed vessel 17 and 18 has a first and second feed gas (motive fluid) inlet 26 and 27 respectively near the top of the vessel below the hopper valve means 19 and 20 (preferably above the level to which the feed vessels are filled). The slug hopper 21 is equipped with a slug hopper gas (motive fluid) inlet 28 located at the top of the slug hopper 21. All of the above described inlets are in communication with the gas (motive fluid) control and supply means 13 via gas (liquid) control and supply tubes 29 (which are considered part of the gas control and supply means 13).

The slug hopper 21 is in communication with the slug forming and loading means 30 preferably with the top of the slug forming and loading means 30. The slug forming and loading means 30 is equipped with a slug forming and loading gas (motive fluid) inlet 31 located at the upstream end of the slug forming and loading means 30.

The downstream end of the slug forming and loading means 30 is connected to the conveyor tube 32 (via an optional transition piece 33 when the slug forming and loading means 30 and the conveying tube 32 have different cross section shapes).

At various points along the conveying tube 32 there are a plurality of booster gas (motive fluid) inlets 34. Each booster gas inlet 34 could be connected to its own gas control and supply line 29 or preferably each of the booster gas inlets 34 may be connected to a booster supply tube 35 and all of the booster supply tubes 35 may be connected to the gas control and supply system 13, preferably through a booster supply line 36. When a booster supply line 36 is employed each booster supply tube 35 has a tube check valve 37 therein and the booster supply line 36 has booster supply line check valves 38 between each connection to a booster supply tube 35. The upstream end of the booster supply line 36 is connected to the gas control and supply means 13 through a booster supply line gas (motive fluid) inlet 87.

A pressure sensing control inlet 39 may be placed anywhere in the conveying system and in practice several potential pressure sensing control inlets 39 are constructed at points over the system. One of these pressure sensing control inlets 39 (preferably one in the conveying tube) is connected to the gas control and supply means 13 preferably via a control inlet tube 40; preferably having a control inlet check valve 41 and/or a filter 42.

The detail of the slug forming and loading means 30 of FIG. 1 may be seen in FIGS. 2-5. The preferred shape of the slug forming and loading means 30 is rectangular because this facilitates using rectangular venturi within the slug forming and loading means 30 which makes the venturi easy to build, easy to adjust and readily flexible.

Focusing on FIG. 2 for details of the slug forming and loading means 30 there is a housing 43 (rectangular) having a slug forming and loading gas (motive fluid) inlet 31 at the upstream end and a first (or feed) venturi 44 immediately downstream of the slug forming and loading gas inlet 31.

When the slug forming and loading means 30 is formed from the preferred rectangular housing 43 of FIGS. 1-6; the first venturi 44 is formed from two opposing vanes 45 and 46, preferably two parrallel (when viewed horizontally) horizontal vanes, preferably a top vane 45 and a bottom vane 46. The first venturi 44 has a wide mouth section 47, a throat section 48 and exit section 49. The two vanes 45 and 46 are attached on their upstream end to the rectangular housing 43, preferably to the top and bottom of the rectangular housing 43 preferably by a first venturi attachment hinge means 50 for enabling the vanes to move so that the throat opening 70 can be adjusted and be free to oscillate. A typical hinge means 50 consists of a hinge 51 with a rubber stop 52 to prevent the vanes from striking the inside of the housing 43. Projecting into the housing 43, preferably from the top and bottom of the housing 43 preferably at the entrance to the throat section 48 are two first venturi adjustment means 53 for adjusting the direction, size and tension on the throat 44 where the vanes touch 70. Each first venturi adjustment means 53 has a resilient adjustment member 54 at its vane/adjustment means interface to aid the vibration or oscillation action of the first venturi 44 and to adjust the size of the throat. The first venturi adjustment means 53 may be a screw with a rubber pad on its end.

The sides of the first venturi vanes 45 and 46 are preferably equipped with a venturi vane gasket 55 (see FIG. 3) which seals the venturi so that all of the gas passes through the venturi 44 and does not leak around the sides while allowing movement of the vanes.

Downstream of the first venturi 44 is a second (main or slug forming and loading) venturi 56. The second venturi has a conveyant or fluid material opening 57 therein, preferably in the top portion in the throat 63 section of the second venturi 56. Attached, at a point between the material opening 57 and the upstream end of the slug forming and loading means 30 at a point such that when extended it will cover the material opening 57, is a flutter valve 58 made of a flexible sheet of material such as metal, plastic, rubber or leather (preferably rubber), of such a length and width and attached so that when directed downstream it at least covers the second venturi material opening 57. Additional length may be added to the flutter valve 58 to change the characteristics of its wave motion or the frequency it generates so as to suit the characteristics of the material being handled.

While the slug hopper 21 can open directly through the material opening 57 into the main venturi, in a preferred embodiment the slug hopper 21 is attached to and in open communication with a material chamber 59 which is located outside the second venturi 56 (above the top of the second venturi when the material opening 57 is on the top) most preferably upstream of the material opening 57. The side of the material chamber 59 has a chamber opening 60 which is in open communication with the one end of a chamber conduit 61 whose other end is in open communication with the second venturi material opening 57.

The second venturi 56 has a mouth section 62, a throat section 63 and an exit section 64. The first venturi exit section 49 is part of the second venturi mouth section 62. The material opening 57 is preferably in the second or slug forming and loading venturi throat section 63.

When the slug forming and loading means 30 is a rectangular housing 43, the second venturi 56 is preferably formed from two vanes 65 and 66 plus 67 preferable from a horizontal second venturi bottom vane 65, a horizontal second venturi upstream top vane half 66, second venturi downstream top vane half 67 and the flutter valve 58 which is capable of covering the material opening 57 that is formed by the gap between the two second venturi top vane halves 66 and 67. The vane and vane part 67 and 65 are preferably made of flexible material so that during operation they flex. The material chamber 59 and the material conduit 61 are formed by the second venturi upstream vane 66, the sides of the rectangular housing 43 and the top of the rectangular housing 43. In a preferred embodiment of the invention the bottom of the slug hopper 21 is extended (down) into the interior of the rectangular housing 43 because it forms a convenient support on which to attach the second venturi upstream vane 66 and forms a material chamber 59 when the downstream end is removed to form the chamber opening 60. It is preferred that the slug hopper 21 bottom opening 92 be upstream of the material opening 57.

Figure 5:
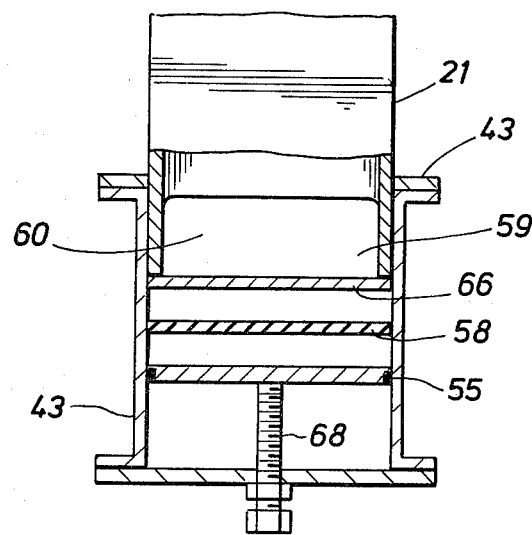
FIG. 5 is a view upstream of the apparatus of FIG. 1 bisected along the line 5—5.

In a preferred embodiment of the invention the downstream end of the second venturi bottom vane 65 and/or the second venturi downstream top vane 67 are attached to the rectangular housing 43, preferably to the bottom and top, respectively, of the rectangular housing 43 by a vane hinge means 51 for allowing the vanes to pivot and equipped with a rubber stop 52. Both vanes 67 and 65 are equipped with one or more second venturi adjustment and support means 68 for adjusting the shape and height of the vanes and for holding the vanes 67 and 65 in position. When the vanes are adjustable, at least one of the adjustment and support means 68 is attached to the vane 67 and to the vane 65 and forms the support to hold these vanes in place. Vanes 67 and 65 are preferably made of material (most preferably metal) which will allow them to flex or vibrate at some frequency during operation. The sides of the vanes 67 and 65 may be equipped with resilient gasket means 55 as shown in FIG. 5 for sealing while allowing movement.

The conveying tube 32 usually has a circular cross sectional shape, therefore when the housing 43 is rectangular it is preferred that there be a transition section 33 to gradually change the cross section shape from rectangular to circular.

The bisected (down the length) conveying tube 32 is shown in FIG. 2 with its booster gas (motive fluid) inlets 34 and its pressure sensing ports or inlets 39. Booster gas inlets 34 and pressure sensing ports 39 which are not in use are sealed with a seal plug 69.

Figure 3:
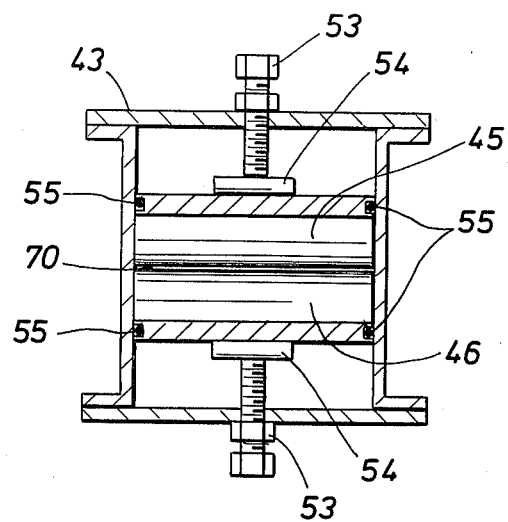
FIG. 3 is a view from upstream of a section of the first venturi as bisected along line 3—3 of FIG. 1 (and FIG. 2).

FIG. 3 shows a cross section view (looking downstream) of a section of the rectangular housing 43, the section taken just upstream of the first venturi adjustment means 53. This figure shows the top and bottom vanes 45 and 46, at rest touching at position 70. The resilient adjustment member 54 is again shown as a rubber member, but could be made of any resilient material including a spring. In operation, the adjustment means 53 hold the vanes 45, 46 together at point 70 until pressure has built to a point necessary to overcome the force of the adjustment means 53, then the vanes 45, 46 part allowing gas to pass downstream.

Venturi are conventionally conically or cylindrically shaped and the apparatus of this invention could be made from cylindrically shaped venturi. But, the preferred embodiment is the rectangular shape, because it is so much easier to build and it can be made with an adjustable throat size or cross sectional area. (See FIG. 6 and 7 for a cylindrical embodiment of the invention where the housing 43 is the venturi and the material opening 57 is directly into the slug forming and loading venturi 56; described below.)

Figure 4:
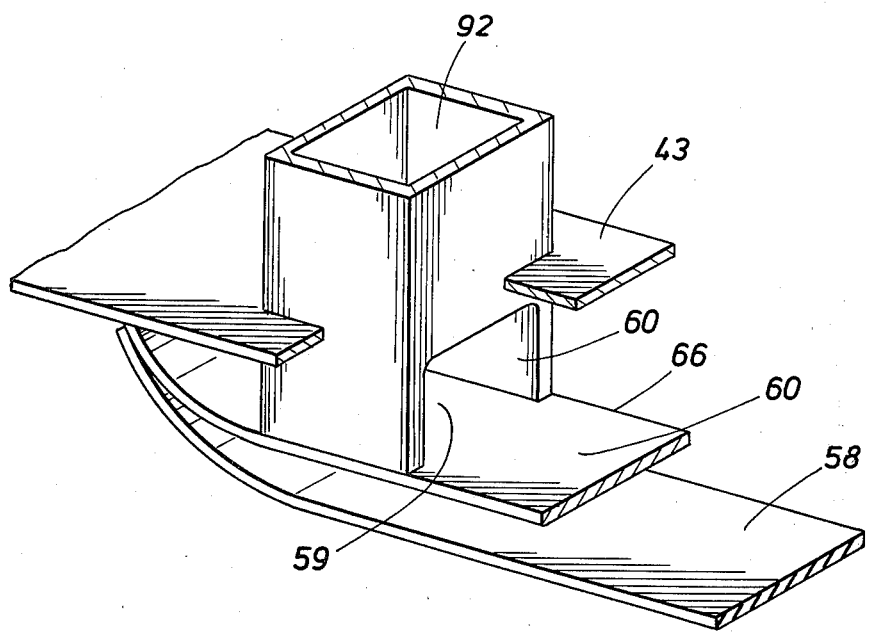
FIG. 4 is the first section of the top vane of the second venturi where the outer sides have been cut away to show the slug feed hopper opening on top of the first section of the top vane.

Focusing on FIGS. 4 and 5 (which are details of the inside of the slug forming and loading means 30 of FIGS. 1 and 2) that show the entrance of the slug hopper 21 into the slug forming and loading means 30, these two figures show the top of the second venturi 56, the material chamber 59, the chamber opening 60, the material conduit 61 and the material opening 57. The combination of the material chamber 59, the material conduit 61, the chamber opening 60, and the material opening 57 could be a curved pipe connecting at one end to the bottom of the slug hopper 21 and at the other end into the throat 63 of the second venturi 56. For maximum flexibility in handling a variety of materials, it is preferred that the slug hopper bottom opening 92 does not open directly over the material opening 57.

When the slug forming and loading means 30 is a rectangular housing 43 and the slug hopper bottom opening 92 and material opening 57 are on the top, the chamber 59 may be formed from the upstream top second venturi vane 66, and the sides and top of the rectangular housing 43. It is preferred to construct the chamber 59 from an extension of the slug hopper 21 to act as a place to fix the vane 66 and to shorten the upper portion of the chamber 59 by extending it into the housing 43, fixing it to the vane 66 and removing the downstream side inside the housing 43 to form the chamber opening 60.

FIG. 4 shows the flutter valve 58 fixed at (or behind) the upstream end (of the upper part) of the second venturi 56. It may be fixed anywhere behind the fluid material opening, preferably anywhere between the upstream end of the vane 66 and the upstream end of the housing 43 as long as it is capable of closing the material opening 57 when pressed against same. When it is fixed behind the adjustment means 53 it passes between the adjustment means 53 and the top vane 45.

FIG. 5 shows another view of this chamber 59 section, looking upstream from downstream of the chamber 59, showing a cross section of the chamber 59, chamber opening 60, the upstream second venturi's top vane 66, the flutter valve 58, the bottom second venturi vane 65 at the throat 63 of the second venturi 56 showing a second venturi adjustment and support means 68 and the venturi gasket means 55.

During operation, material in the slug hopper 21 fills the chamber 59 and spills over into the conduit 61 and material opening 57 and on top of the flutter valve 58. The vibrational or wave action of the flutter valve 58, induced by the pressures produced by the first and/or second venturi 44, 56 and/or a pulsed gas (motive fluid) input, feeds material into the second venturi throat area 63 and thereby forms the slugs. The length and stiffness of the flutter valve 58 also contribute to the frequency of its undulations and therefore the manner in which it opens and closes the material opening 57.

Figure 6:
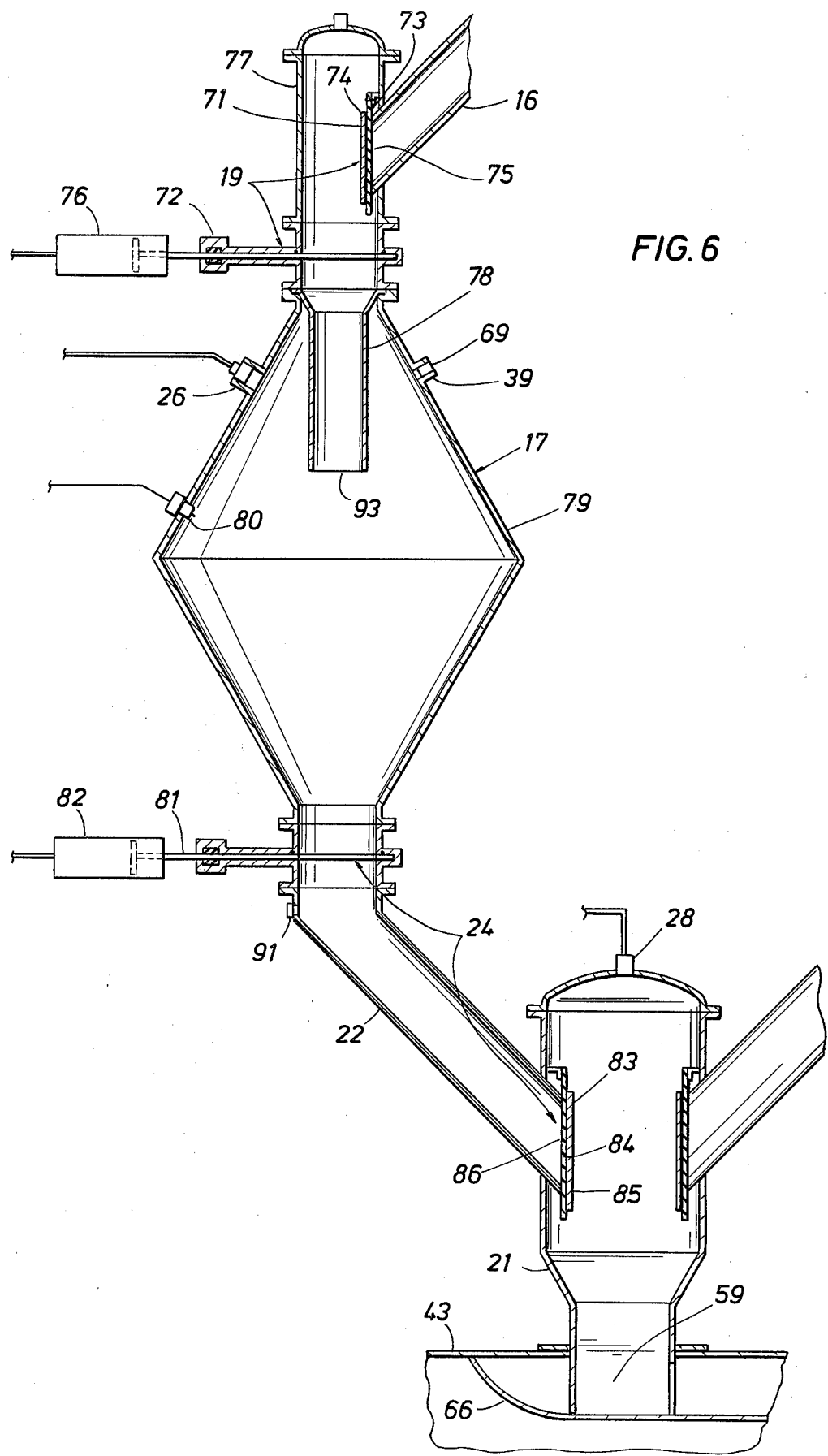
FIG. 6 is a side view of the first feed vessel and slug hopper of FIG. 1, bisected along line 6—6.

FIG. 6 shows the details of one half of the material supply system 14 of FIG. 1 (the other half (second) being a duplicate) excluding the material hopper 15, bisected along line 6—6. Material, such as catalyst particles, are stored in a large material hopper 15 (not shown in FIG. 6) and hopper feed tube 16, which is in open communication with the material hopper 15 at its upper end and communicates with the feed vessel 17 (18, second) through the hopper valve means 19 (20).

The hopper valve means 19 (20) is shown in FIG. 6 as two valves, a flapper valve 71 and a gate valve 72. If only one valve is to be used, the preferred valve is the slide gate valve. The flapper valve 71 which consists of a rubber sheet 73 attached to and backed by a metal sheet 74, both larger than the tube opening 75, attaches so that the rubber 73 presses against the circumference of the opening 75 to close the opening 75. However, the flapper valve 71 does not work well with certain types of particles, for example, light and/or large particles. It was found preferable to equip the apparatus with two valves, both the flapper valve 71 and a gate valve 72, and to keep one or the other open depending upon which one worked well, and use the one that worked as the valve means 19 (20). The gate valve 72 is a commercially available gate valve 72, operated by a gas or hydraulically operated piston 76 connected to the gas control and supply system 13. The preferred embodiment of the invention as a feed vessel 17 (18) with upper head 77 into which the tube 16 dumps material, the the material passes from the upper head 77 through the upper head conduit 78 into the main feed vessel 79. The feed vessel 17 (18) is equipped with a feed gas inlet 26 (27), placed downstream of the valve means 19, which is connected to the gas control and supply means 13 for pressurizing the vessel.

Optionally the feed vessel 17 (18) is equipped with a feed level indicator means 80 for indicating when the material has reached a certain level in the vessel 17 (18) and to send this signal back to the gas control and supply means 13. The means 80 could be mechanical, electrical, hydraulic or pneumatic or a combination of these. But, having a level sensing means 80 is optional because the filling of the vessel 17 (18), the duration the valve means 19 (20) is held open, could be simply timed, and the time controlled by the gas control and supply means 13, i.e. gas supplied either into the vessel 17 (18) through the feed gas inlet 26 (27) to shut the flapper valve 71 or to (and from) the piston 76 to open and close the gate valve 72. On the other hand, when the material to be moved is a particulate solid, the level to which the feed vessels 17 and 18 are filled can be simply controlled by the depth to which upper head conduit 78 extends down into the vessel since the particulate material will stop when the peak of the pile inside the vessel fills the upper head conduit opening 93.

The main feed vessel 79 is in communication, through the feed valve means 24 (25) and the feed tube 22 (23), with the slug hopper 21. Again, the valve means 24, can be any valve type that works but it has been found preferable to have both a slide gate valve 81, operated by the slug piston 82 (connected to the gas control and supply means 13), and a slug flapper valve 83. The slug flapper valve 83 is a rubber sheet 84, backed by a metal sheet 85, both larger than the feed tube opening 86. The slug flapper valve 83 is hung so that pressure inside the slug hopper 21 greater than in the tube 22 (23) will force the rubber 84 against the circumference of the feed tube opening 86. If only one valve is used, a slide gate valve is preferred.

The embodiments discussed above are directed toward an apparatus which can be adjusted to handle a variety of types of material or types of particulate materials, under a variety of conditions. There are, however, situations where one can devote the invention to a single use, i.e. moving one type (or a small variety of materials) under essentially the same conditions. In this situation it is sometimes possible to use a simplified slug forming and loading means 30. Such an embodiment of the slug forming and loading means 30 is depicted in FIGS. 7 and 8.

Figures 7, 8:
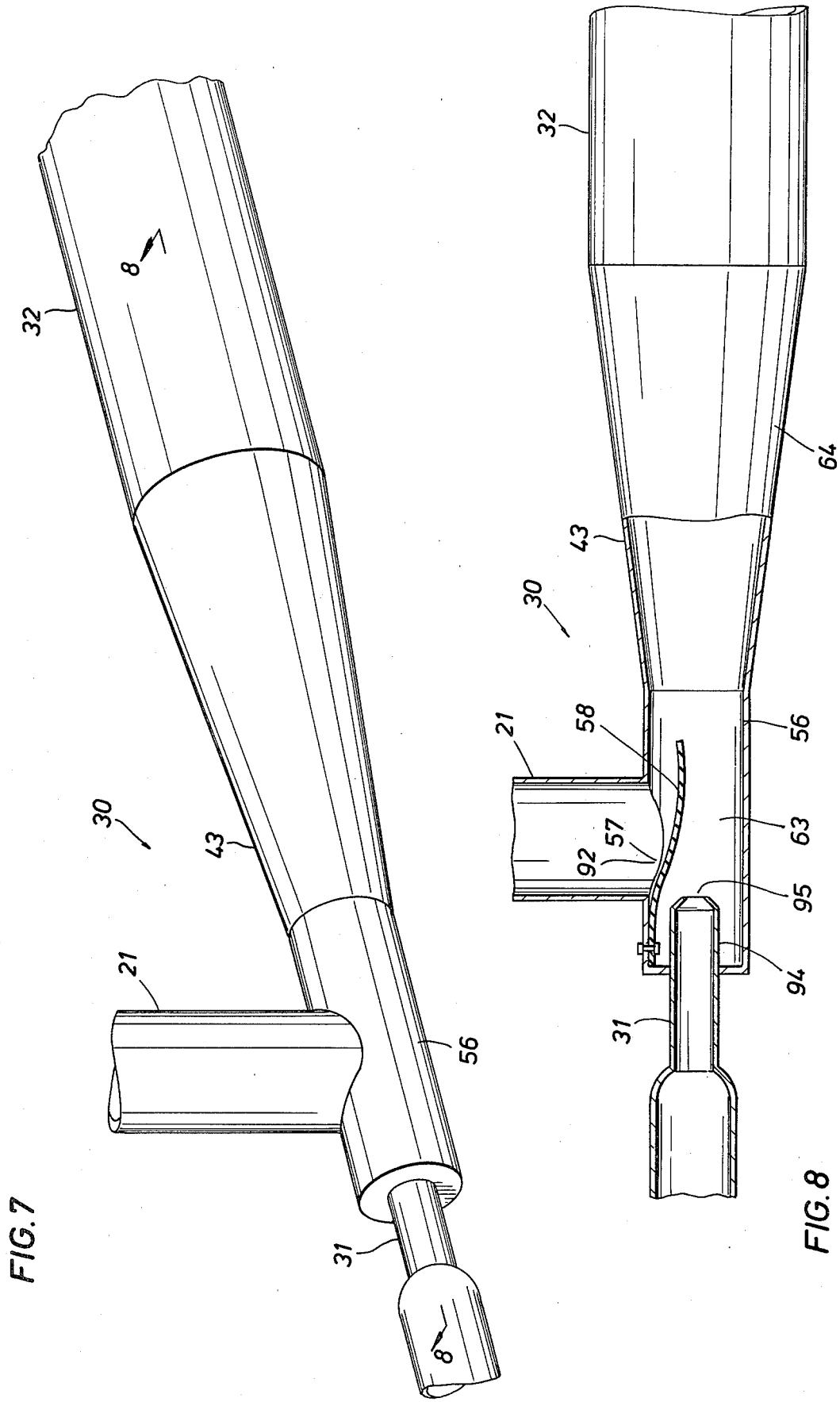
FIG. 7 is a side view of an embodiment of the invention in its most simple form.
FIG. 8 is a side view of the embodiment of FIG. 7 bisected along the line 8—8.

FIG. 7 is a view of the slug forming and loading means 30 where the housing 43 (cylindrical) is the main venturi, a cylindrical venturi, a main venturi 56 corresponding to the second slug forming and loading venturi 56 of the two venturi systems described above. The slug hopper 21 is shown entering the throat 63 of the venturi 56. The upstream end of the housing 43 (or main venturi 56) is connected to a slug forming and loading gas or liquid (motive fluid) inlet 31 which is connected to the gas or liquid (motive fluid) controlling and supplying means 13 (not shown in FIGS. 7 and 8). The downstream end of the slug forming and loading means 30 is in open communication with the conveying tube 32.

Focusing on FIG. 8, which is the embodiment of FIG. 7, bisected down its length, one sees the main venturi 56 with its slug forming and loading gas inlet 31 which preferably forms a nozzle 94 inside the venturi 56 with a nozzle opening 95 opening into the throat 63 of the main venturi 56 at its upstream end. The same nozzle may be used in the two venturi, rectangular apparatus shown in FIGS. 1–5. Also opening into the throat 63 is the material opening 57, which in this embodiment is the same opening as the slug hopper bottom opening 92, i.e., the slug hopper opens directly into the throat 63 (preferably into the side or top) rather than into a slug chamber 59 as in the embodiments above. A flutter valve 58, made of a flexible material, (metal, leather, plstic, cloth or rubber) is attached inside the housing 43 upstream of the material opening 57 so that when pushed flat against the inside of the housing 43 the flutter valve 58 covers the material opening 57. The embodiment of FIGS. 7 and 8 can be connected to the gas (motive fluid) source 11, through the gas (motive fluid) control and supply means 13, the means for supplying a continuous source of material and a conveying tube which can be connected to a pressure booster means.

The method of this invention may vary according to the type of fluid material being moved. Furthermore, the type of material being used determines the pressures, amount, place and time that fluid pressure is supplied to the feed supply and conveying and loading systems.

Certain basic logic is true in each of the preferred embodiments of the method. The gas (motive fluid) source (or sources) 11 must be able to deliver gas (motive fluid) at a maximum of at least greater than the maximum resistance in the system, typically at least 15 pounds per square inch (psi), preferably 150 psi, most preferably 300 psi. Gas pressure at an upstream point in the system should be higher than a downstream point in the system in order to move the material from the feed vessels 17, 18 to the slug hopper 21, from there to the slug forming and loading means 30, and from there to and out of the conveyor tube 32. Except for the slug forming and loading gas (motive fluid) inlet 31, this essentially means that the inlet gas pressure at the feed vessel inlets 26 and 27 is higher than the inlet gas pressure at the slug hopper gas inlet 28 and the inlet gas pressure at the slug hopper gas inlet 28 is higher than the gas inlet pressure at each booster gas inlet 34, while the gas inlet pressure at each booster gas inlet 34 is higher than the downstream booster gas inlet. The gas inlet pressure at the slug forming and loading gas inlet 31 is determined by the desired pressure at the material opening 57 which is dependent on the efficiency of the venturi system (one as in FIGS. 7 and 8 or two as in FIGS. 2 and 3). The gas inlet pressure at the slug forming and loading inlet 31 could be considerably higher than at the slug hopper gas inlet 28 but because of the drop across the venturi the pressure during a pulse of gas into the inlet 31 at the material opening 57 would be less than the pressure above the material in the slug hopper 21. The drop in pressure while theoretically predictable, has been found in practice to be something that, to a certain degree, had to be determined by trial and error for each different material.

It should be understood that the instantaneous pressure at every point in the apparatus can't be easily predicted or determined. The predetermined pressures are those of the motive fluid as it enters inlets 31, 28, 34, 26, 87. While the apparatus is functioning, pressure at a particular point will change as the material and/or slugs are moved forward (or not moved). The pressure only begins to build inside the apparatus when there is a resistance (a blockage) built up in the system. For example, if one had a single moveable plug in a pipe (closed at its upstream end) with a gas (motive fluid) inlet upstream of the plug, and introduced gas in pulses at an inlet pressure of 45 psi, the pressure inside the pipe would begin to increase behind the plug until it had reached the pressure behind the plug sufficient to overcome the resistance offered by the plug. The plug would start to move increasing the volume behind the plug, dropping the pressure behind the plug and eventually moving the plug out of the pipe. At that point, it would be essentially like venting the 45 psi gas into the atmosphere, through the pipe.

Focusing on the slug form and loading means 30, assuming one had a slug hopper 21 continually fed by the other parts of the material feed system 14, one can operate the slug forming and loading means 30, so that it draws material from the slug hopper 21 and moves it through the conveyor tube 32 by feeding pulses of gas (or liquids; motive fluid) into the slug hopper inlet 28 and the slug forming and loading gas inlet 31. In the simplest mode of operation, a pulse of gas, at the same pressure, is simultaneously pulsed to the two inlets 31 and 28. Because of the effect of the venturi, this insures the pressure at the material opening 57 is less than upstream in the slug hopper 21. The pressure of the gas and the quantity of gas pulsed, i.e. the duration of a pulse is dependent on the material being moved.

A more preferred simple mode of operating the slug forming and loading means 30 and the conveying tube 32 is to alternately pulse gas to the slug hopper inlet 28 and then the slug forming and loading motive fluid inlet 31. A preferred embodiment of this alternating pulsed gas method is to set the controls so that the gas pulsed to the slug forming and loading inlet 31 is supplied at an inlet pressure such that it produces a pressure at the material opening 57 a predetermined number of pounds per square inch (psi) less than that within the slug hopper 21.

Because of the pulsed input of the motive fluid it is possible that the plugs formed in the system actually move backward at some given time but the net result of the pulsed input is that the slugs move forward and out of the conveying tube 32.

A most preferred method of operating the apparatus is to monitor the pressure at some specific point in the system, i.e., on the slug hopper 21, slug forming and loading means 30 or the conveying tube 32, and send that pressure reading to the gas (motive fluid) control and supply means 13, i.e. monitoring at one of the pressure sensing control inlets 39 and tieing the pressure of the gas or motive fluid supplied to the system by the gas or motive fluid control and supply means 13, to the pressure sensed within the system. The pressure differences are maintained, i.e., the pressure in the slug hopper 21 is higher than the pressure at the material opening 57 which in turn is higher than downstream.

The gas (motive fluid) control and supply means 13 is set so that it will deliver a set minimum inlet pressure and a set maximum pressure, while still maintaining the difference between the pressures at the various points in the system. Furthermore, the gas (motive fluid) control and supply means 13 is programmed to raise the pressure in steps (still maintaining the differences) only when it received a signal from the system. Furthermore, the system only sends the signal when it is reading a certain set pressure.

The most preferred method may be best understood by a specific example, however, the pressures cited are for illustration purposes only and should not be taken as limitations on the invention. For example, the gas control and supply means 13 could be set to supply alternating pulses of gas to the slug hopper inlet 28 at an inlet pressure of 35 psi and the slug forming and loading inlet 31 at an inlet pressure such that the pressure at the material opening 57 is less than in the hopper 21 and upon receiving a signal to raise the pressure of each of the two pulses, to do so by 5 psi at some interval for as long as it is receiving the signal or until the maximum pressure reading was 100 psi and to drop back to the original minimum psi levels if not receiving the signal. The pressure sensing control inlet 39 (88) on the slug forming and loading inlet 30 or on the conveying tube 32 could be chosen and a line led from that inlet 39, having a check valve 41 set at 20 psi, to the gas control and supply system 13.

The conveying system would operate without a signal as long as no large plug formed and built up resistance. But when the slugs stopped moving the pressure would begin to build and when it reached greater than 20 psi at inlet 39 (88) it would send a signal to the gas control and supply system to begin raising the pressure of each of the two pulses. The pressure would build until the block was overcome (the slugs moved) at which point the pressure would drop throughout the system (below 20 psi at inlet 39 (88)), the signal would stop and the pulses fall back to the original minimum levels. It's preferred that the maximum pressure be limited so that the system is not damaged.

Other preferred embodiments of the method of the invention involve superimposing the operation of the booster system on the method embodiments described above.

The booster system can operate in two modes. The first mode involves connecting each of the booster gas (motive fluid) inlets 34 to a gas (motive fluid) supply line 29 of the gas (motive fluid) control and supply means 13 which pulses gas individually to each inlet 34 at a reduced inlet pressure compared to the booster gas inlet 34 immediately upstream, the most upstream inlet 34 being supplied gas at a inlet pressure below the gas pressure at the material opening 57.

The more preferred mode, a demand mode, is to connect the booster gas (motive fluid) inlets 34, through a booster supply tube 35 to a booster supply line 36 and the upstream end of the booster supply line 36 to the gas control and supply means 13 through inlet 87. A check valve 37 is placed in each booster supply tube 35 and in the booster supply line 36 between each connection of a booster supply tube 35 to the booster supply line 36. The check valves 37 and 38 are set so that the gas encounters more resistance the further it travels down the booster gas line 36. The booster supply line 36 is supplied with a gas pulse at a gas inlet pressure which will produce a pressure at the most upstream booster inlet 34 (89) less than the gas pressure at the material opening 57. The pulse probes whether the path through the first booster gas inlet 34 (89) and into the conveying tube 32 is easier than the path through the second booster gas inlet 34 (90). If the conveying tube 32 is blocked, the pulse travels down the booster gas line 36 until it finds a booster gas inlet 34 where it can enter and move the downstream slugs. Moving these downstream slugs makes it easier to move the remaining upstream plugs and the next pulse enters the conveying tube upstream of where the former one did. The booster system delivers the pulse where it is needed and helps maintain and reform the slugs of material.

It is preferred that the booster system be used with the pressure sensing control means 39 and that the pressure sensing control inlet 39 be located in the conveying tube 32, that the pulse to each inlet 34 or, when its a demand system, to the booster gas line 36 be tied to the other pulses to the system, preferably simultaneously with the pulse to the slug forming and loading motive fluid inlet 31, and that the inlet pressure of the gas be lower than the pressure at the material opening 57, for example in the demand system, 25 psi in the illustration used above, and that the pressure of the gas delivered in the pulse to the booster system also increases as the other pulse pressures do in response to the signal from the pressure sensing control means 39 and falls back to the original pressure, when the signal stops, as the other pulse pressures do.

Focusing now on the material feed system or material supply means 14, fluid material, for example, solid catalyst particles, are stored in the material hopper 15 and flow into the hopper feed tubes 16 preferably by gravity feed. The first hopper valve means 19 is opened and catalyst particles flow, preferably by gravity feed, into the first feed vessel 17. The amount of particles is controlled either by closing the first hopper valve 19 at a specified time interval or upon a signal from a level indicator means 80 or from the level of particles rising to the point that it blocks the conduit opening 93. Once the first feed vessel 17 is filled, gas (motive fluid) is added to the first feed vessel 17 through the first vessel feed gas inlet 26 at an inlet pressure greater than that of the gas being added to the slug hopper 21 and the first feed valve means 24 is opened. This allows particles to flow from the first feed vessel 17 to the slug hopper 21. (Optionally, motive fluid can be added at inlet 91 to facilitate material movement.)

During the period the first feed vessel 17 is open to the slug hopper 21, the second feed valve means 25 is closed, this second hopper valve is opened and particles fill the second feed vessel 18. Once the first feed vessel 17 has emptied into the slug hopper 21, the first feed valve means 24 closed, the second feed vessel 18 filled with particles, the second hopper feed valve 20 closes, and optionally the excess pressure of the first feed vessel 17 is dumped to the second feed vessel 18 (or the atmosphere or a storage tank), gas is supplied to the second feed gas inlet 27 and the second feed valve means 25 opened dumping the particles into the slug hopper 21. This procedure is continued alternately filling and emptying first one then the other feed vessel 17, 18 so as to supply the slug hopper 21 with material.

The preferred method of the invention is to tie the pressure of the gas (motive fluid) to the first and second feed vessel gas (motive fluid) inlets 26 and 27 to the pressure sensing control signal and to maintain their pressure higher than the pressure of the gas supplied to the slug hopper inlet 28.

While really dependent on the type of material used, the difference between the inlet gas (motive fluid) pressure of the gas supplies to successive points moving downstream, i.e., the feed gas inlets 26, 27, the slug hopper inlet 28, the material opening 57 and the booster supply line inlet 87 (when in the demand mode) (or each successive conveyor, tube inlet 34) can range, in general, from about 3 to about 15 psi, preferably about 3 to about 7 psi, the higher pressure being the upstream point. The pulses to the slug hopper inlet 28 and the slug forming and loading inlet 31 may alternate at any rate, but is is preferred that the rate be between about 3 times/second to about 1 time/second, more preferably between about 2 times/second to about 1.5 times/second. In general, the pulses to the feed vessels 26, 27 are simultaneous with the pulses to the slug hopper 21 while the pulses to the booster gas inlets are simultaneous with those to the slug forming and loading gas inlet 31.

The pulses of gas (motive fluid) entering the slug forming and loading inlet 31 into the first venturi 44, burst through the throat 48 where the two vanes 45 and 46 are held together 70 by the adjustment means 53, out of the expansion section 49 into the second venturi 56 and impinge on the gas wetted side of the flutter valve 58. It is the vibration or spitting of the first venturi 44, the pulsing gas, and, the second venturi pressure drop and flex that cause the flutter valve to flutter, vibrate or undulate and admit the particles which form the slugs and move through the system.

The conveying tube 32 is shown as straight and level but need not be so and the apparatus 10 can move material around corners and up and down.

The conveying tube opening 96 is directed in the desired direction and may be placed so as to dump the slugs of material into a receiver or into the atmosphere. The receiver could be open to the atmosphere or closed and maintained at some set pressure, either above or below atmospheric pressure. Inlet pressures across the system are adjusted to, accommodate the receivers pressure still maintaining the pressure profiles, i.e. the relative pressures described above.

Some solid particulate materials are particularly hard to move and it is necessary to supply gas streams elsewhere in the system, for example at inlet 91 during the opening of the feed valve means 24/25 in order to facilitate movement. Inlet 91 is particularly useful when employing the flapper valves 83.

In practice, one sets the relative pressures of the pulses empirically by adjusting the pressure so as to move the slugs of material out of the conveying tube exit opening 96 as gently as required. Pressure profiles of a high of 22 psi to a low of 12 psi have been employed to move some catalyst materials. Dense, non-uniform particles require somewhat higher pressure but the apparatus should be adjusted so as to maximize its efficiency with that particular type of material.

I claim as my invention:

1. A fluid material slug conveying apparatus comprising:
   (i) a source of motive fluid;
   (ii) a motive fluid controlling and supplying means connected to the motive fluid source for supplying motive fluid at required pressures, quantities, positions and times;
   (iii) a fluid material supply means for supplying a continuous source of fluid material to be conveyed by the motive fluid;
   (iv) a slug forming and loading means for forming and loading slugs of fluid material comprising a slug forming and loading housing having a slug forming and loading motive fluid inlet at its upstream end, said slug forming and loading motive fluid inlet attached to and supplied by the motive fluid controlling and supplying means, the housing having a slug forming and loading venturi therein downstream of the slug forming and loading motive fluid inlet, the slug forming and loading venturi having a fluid material opening in the throat of the venturi, said fluid material opening being connected to and allowing open communication between the fluid material supply means and the throat section of the slug forming and loading venturi, a flutter valve comprising a piece of flexible material attached at one end to the inside of the housing, upstream of the fluid material opening, of a length and a width such that when extended downstream and pressed against the fluid material opening it essentially covers said fluid material opening;
   (v) a conveying tube having its upstream end attached to and in open communication with the downstream end of the slug forming and loading housing and having its downstream end in communication with and directed to the fluid material slug's destination.

2. The fluid material slug conveying apparatus of claim 1 where the fluid material opening is connected to and in open communication with the downstream end of a material conduit, the upstream end of said material conduit being connected to and in open communication with a material chamber, said chamber being connected to and in open communication with the fluid material supply means.

3. The fluid material slug conveying apparatus of claim 1 or 2 where the housing has a first venturi therein between the slug forming and loading motive fluid inlet and the slug forming and loading venturi, the expansion section of the first venturi opening into the mouth section of the slug forming and loading venturi.

4. The fluid material slug conveying apparatus of claim 3 where the slug forming and loading housing has a rectangular shape and the first venturi and the slug forming and loading venturi are each formed by two opposing vanes.

5. The fluid material slug conveying apparatus of claim 4 where each of the two opposing vanes of the first venturi are connected to the housing at their upstream end by a first venturi hinge means and each of said vanes has a first venturi adjustment means for directing and adjusting the opening of the first venturi throat section.

6. The fluid material slug conveying apparatus of claim 5 where the first venturi adjustment means are equipped with a resilient adjustment member at the point the adjustment means touches the vane to aid the vibration action of the first venturi.

7. The fluid material slug conveying apparatus of claim 6 where the conveying tube has at least one booster motive fluid inlet for supplying motive fluid to some point of the conveying tube, said booster motive fluid inlet connected to and supplied by the motive fluid controlling and supplying means.

8. The fluid material slug apparatus of claim 7 having greater than one booster motive fluid inlet, each booster motive fluid inlet connect to a booster supply tube and all of the booster supply tubes connected to a booster supply line, the downstream end of the booster supply line connected to the booster supply tube of the most downstream booster motive fluid inlet and the upstream end of the booster supply line connected to and communicating with the motive fluid controlling and supplying means, each booster supply tube having a tube check valve therein and each segment of the booster supply line between two booster supply tubes having a line check valve therein.

9. The fluid material slug conveying apparatus of claim 8 where the fluid material supply means comprises:
   (i) a material hopper for storing and supplying the material;
   (ii) first and second feed vessels each feed vessel in communication at its upstream end with the material hopper through a first and second hopper feed tube, each hopper feed tube being equipped with a first and a second hopper valve means for controlling the flow of material from the material hopper to the feed vessels, each feed vessel having a feed motive fluid inlet connected to and supplied by the motive fluid supplying and controlling means;
   (iii) a slug hopper in communication at its upstream end through a first feed tube to the downstream end of the first feed hopper and through a second feed tube to the downstream end of the second feed hopper, each feed tube equipped with a feed valve means for controlling the flow from the feed hoppers to the slug hoppers, the downstream end of the slug hopper in open communications with the material opening, the slug hopper having a slug hopper motive fluid inlet connected to and supplied by the motive fluid supplying and controlling means.

10. The apparatus of claim 7 where the apparatus is equipped with a plurality of pressure sensing control inlets and at least one of these is connected to and communicating with the motive fluid supplying and controlling means.

11. The apparatus of claim 8 where the apparatus is equipped with a plurality of pressure sensing control inlets and at least one of these is connected to and communicating with the motive fluid supplying and controlling means.

12. The apparatus of claim 9 where the apparatus is equipped with a plurality of pressure sensing control inlets and at least one of these is connected to and communicating with the motive fluid supplying and controlling means.

13. A method of conveying slugs of fluid material through an apparatus, said apparatus comprising:
   (i) a source of motive fluid;
   (ii) a motive fluid controlling and supplying means connected to the motive fluid source for supplying motive fluid at required pressures, quantities, positions and times;
   (iii) a fluid material supply means for supplying a continuous source of fluid material to be conveyed by the motive fluid;
   (iv) a slug forming and loading means for forming and loading slugs of fluid material comprising a slug forming and loading housing having a slug forming and loading motive fluid inlet at its upstream end, said slug forming and loading motive fluid inlet attached to and supplied by the motive fluid controlling and supplying means, the housing having a slug forming and loading venturi therein downstream of the slug forming and loading motive fluid inlet, the slug forming and loading venturi having a fluid material opening in the throat of the venturi, said fluid material opening being connected to and allowing open communication between the fluid material supply means and the throat section of the slug forming and loading venturi, a flutter valve comprising a piece of flexible material attached at one end to the inside of the housing, upstream of the fluid material opening, of a length and a width such that when extended downstream and pressed against the fluid material opening it essentially covers said fluid material opening:
   (v) a conveying tube having its upstream end attached to and in open communication with the downstream end of the slug forming and loading housing and having its downstream end communicating with and directed to the fluid material slug's destination; which comprises
      (1) pulsing motive fluid from the motive fluid controlling and supplying means into the fluid material supply means to force material into the slug forming and loading means through the fluid material opening, and
      (2) pulsing motive fluid from the motive fluid controlling and supplying means into the slug forming and loading motive fluid inlet at an inlet pressure such that the pressure created at the fluid material opening by the slug forming and loading venturi is less than that created in the fluid material supply means, thereby causing the flutter valve to undulate and admit fluid material into the housing.

14. The method of claim 13 where the pulses of motive fluid are alternated between the fluid material supply means and the slug forming and loading motive fluid inlet.

15. The method of claim 14 where the fluid material supply means comprises a slug hopper in open communication with the slug forming and loading means through the fluid material opening, said slug hopper having a slug hopper motive fluid inlet at its upstream end through which the pulsing motive fluid to the fluid material supply means is delivered.

16. The method of claim 15 where the conveying tube has at least one booster motive fluid inlet connected to the motive fluid controlling and supplying means and the method includes pulsing motive fluid into the booster motive fluid inlet at an inlet pressure less than the pressure created at the material opening, each successive downstream booster inlet receiving motive fluid at an inlet pressure less than the immediate upstream booster motive fluid inlet.

17. The method of claim 16 where the pulses of motive fluid to the slug forming and loading inlet and the booster motive fluid inlets are simultaneous.

18. The method of claims 13, 14, 15, 16, or 17 where the apparatus has a pressure sensing control inlet for sending a signal to the motive fluid controlling and supplying means set to send a signal to the motive fluid controlling and supplying means when the pressure within the apparatus at the sensing inlet reaches a predetermined level, the motive fluid controlling and supplying means programmed to raise the inlet pressure of each of the pulses, while maintain their difference, in incremental steps until the most upstream pulse hits a predetermined maximum or the sensing inlet ceases to deliver a signal.

19. The method of claims 13, 14, 15, 16 or 17 where the motive fluid is gas.

20. The method of claim 19 where the fluid material is solid particulate material.

21. The method of claim 20 where the gas is air and the solid particulate material is catalyst particles.

22. The method of claim 18 where the motive fluid is gas.

23. The method of claim 22 where the fluid material is solid particulate material.

24. The method of claim 23 where the gas is air and the solid particulate material is catalyst particles.

* * * * *